(12) United States Patent
Lancioni

(10) Patent No.: US 12,081,521 B2
(45) Date of Patent: Sep. 3, 2024

(54) WEBSITE CLASSIFICATION VIA CONTAINMENT QUERIES

(71) Applicant: McAfee, LLC, San Jose, CA (US)

(72) Inventor: German Lancioni, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 318 days.

(21) Appl. No.: 17/558,522

(22) Filed: Dec. 21, 2021

(65) Prior Publication Data
US 2023/0198947 A1 Jun. 22, 2023

(51) Int. Cl.
*H04L 9/40* (2022.01)
*G06F 16/906* (2019.01)
*G06F 16/951* (2019.01)
*G06F 16/953* (2019.01)

(52) U.S. Cl.
CPC ........ *H04L 63/0236* (2013.01); *G06F 16/906* (2019.01); *G06F 16/951* (2019.01); *G06F 16/953* (2019.01)

(58) Field of Classification Search
CPC .... G06F 16/958; G06F 16/906; G06F 16/951; G06F 16/953; H04L 63/0236
See application file for complete search history.

(56) References Cited

U.S. PATENT DOCUMENTS

| | | | |
|---|---|---|---|
| 9,223,554 B1 * | 12/2015 | Lawson | G06F 9/44521 |
| 10,581,866 B1 * | 3/2020 | Edwards | H04L 63/0876 |
| 10,699,192 B1 * | 6/2020 | Kim | G06F 18/217 |
| 11,574,054 B2 * | 2/2023 | Abu Alhaol | G06F 21/568 |
| 11,616,797 B2 * | 3/2023 | Lancioni | G06F 16/2255 726/23 |
| 2010/0161643 A1 * | 6/2010 | Gionis | G06F 16/24534 707/765 |
| 2012/0158696 A1 * | 6/2012 | Arasu | G06F 16/2272 707/715 |
| 2013/0227078 A1 * | 8/2013 | Wei | H04L 67/02 709/224 |
| 2015/0220530 A1 * | 8/2015 | Banadaki | G06F 16/90 707/723 |
| 2017/0147575 A1 * | 5/2017 | Pappu | G06F 16/9537 |
| 2017/0286544 A1 * | 10/2017 | Hunt | H04L 63/123 |
| 2019/0199519 A1 * | 6/2019 | Goyal | G06F 16/215 |
| 2019/0347335 A1 * | 11/2019 | Kohlschuetter | G06F 16/958 |
| 2020/0027064 A1 * | 1/2020 | Mishra | G06F 16/9537 |

(Continued)

*Primary Examiner* — Mohammad A Siddiqi
(74) *Attorney, Agent, or Firm* — Patent Capital Group

(57) ABSTRACT

A computing apparatus, including: a hardware platform including a processor circuit and a memory; and instructions encoded within the memory to instruct the processor circuit to: extract human readable text from a plurality of known websites, the known websites having known classifiers; apply a MinHash algorithm to respective human readable text of the known websites; generate a plurality of different locality sensitive hashing (LSH) indexes for the respective websites; extract human readable text from a test website; apply the MinHash algorithm to the human readable text of the test website to provide a MinHash of the test website; query the plurality of different LSH indexes with the MinHash of the test website; and according to a result of the query, assign a category the test website, wherein the category matches a known category of at least one of the plurality of known website found to have a containment with the test website above a threshold.

20 Claims, 9 Drawing Sheets

(56) References Cited

U.S. PATENT DOCUMENTS

| | | | | |
|---|---|---|---|---|
| 2020/0409945 A1* | 12/2020 | Chen | ............... | G06F 16/24578 |
| 2021/0051176 A1* | 2/2021 | Stolfo | ............... | H04L 63/1491 |
| 2021/0141897 A1* | 5/2021 | Seifert | ............... | G06F 21/561 |
| 2021/0249102 A1* | 8/2021 | Hurwitz | ............... | G16B 50/30 |
| 2022/0027379 A1* | 1/2022 | Unterbrunner | ....... | G06F 16/254 |
| 2022/0198011 A1* | 6/2022 | Kumar | ............... | G06F 21/554 |
| 2022/0222294 A1* | 7/2022 | Wang | ............... | G06F 16/685 |
| 2023/0171267 A1* | 6/2023 | Lancioni | ............... | G06F 21/564 |
| | | | | 726/26 |

\* cited by examiner

WEBSITE CLASSIFICATION VIA CONTAINMENT QUERIES

This application relates in general to computer security and more particularly, though not exclusively, to a system and method for providing website classification via containment queries.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
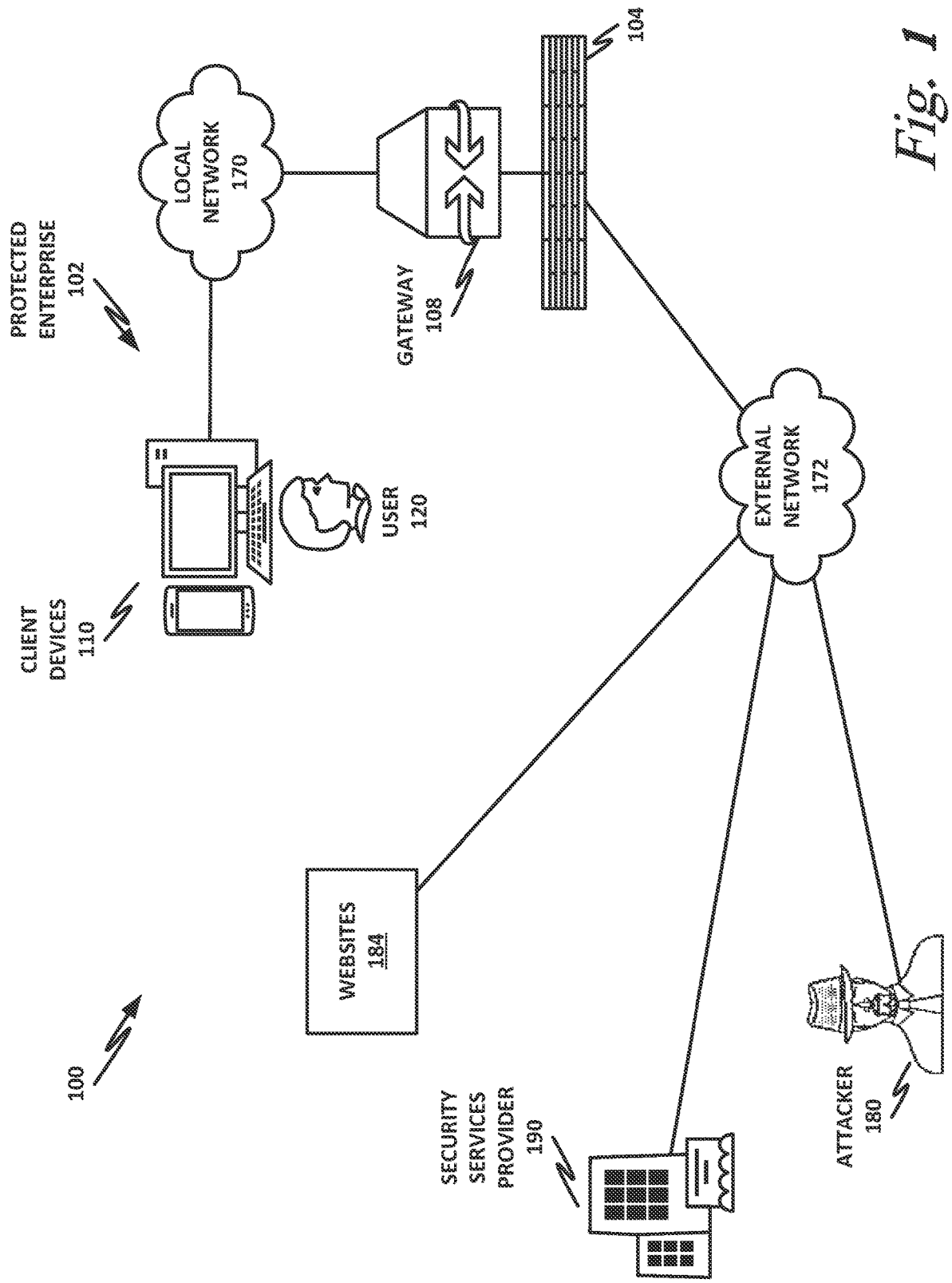
FIG. 1 is a block diagram of a security ecosystem.

A computing apparatus, including: a hardware platform including a processor circuit and a memory; and instructions encoded within the memory to instruct the processor circuit to: extract human readable text from a plurality of known websites, the known websites having known classifiers; apply a MinHash algorithm to respective human readable text of the known websites; generate a plurality of different locality sensitive hashing (LSH) indexes for the respective websites; extract human readable text from a test website; apply the MinHash algorithm to the human readable text of the test website to provide a MinHash of the test website; query the plurality of different LSH indexes with the MinHash of the test website; and according to a result of the query, assign a classifier the test website, wherein the classifier matches a known classifier of at least one of the plurality of known website found to have a containment with the test website above a threshold.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

Websites that share certain common features may usefully be assigned to categories or classes. For example, websites may be classified as enterprise (e.g., for websites or web services provided directly by an enterprise), work-related, business, news, sports, social media, entertainment, web comics, pornography, advocacy of illegal activity, religious sites, streaming audio and video, piracy, or other categorizations. These categorizations or classifications may be highly useful in some contexts, such as in the case of providing a web content filtering service. For example, an enterprise may wish to restrict access to certain types of websites that may waste employees' time or that may reflect poorly on the enterprise. Similarly, a family may wish to use a home gateway to restrict access to certain classes of websites, such as pornography, advocacy of illegal activity, or other similar classes of content that the parents determine may be harmful to the family's values.

In this context, a home gateway may include a router, gateway, DHCP server, or other service that provides web services to either an enterprise or a family or home environment. The home gateway may provide certain gateway services, including web content filtering based on URL. This web content filtering is most useful when websites are properly classified by assigning each website to one or multiple known classes. In some embodiments, each website may be assigned to exactly one class. In other embodiments, multi-nominal classifiers may be used. For example, the website ESPN.com may be classified as both a "sports" website and a "news" website. In other cases, a multi-nominal classifier may be used to assign a website to two, three, four, five, six, or more categories.

It may be relatively straightforward for a home or enterprise administrator to configure a home gateway to exclude certain classes of websites. For example, a particular enterprise may wish to restrict access to gambling, pornography, and video streaming websites. Similarly, a home user may configure a similar home gateway to restrict access to websites, such as gambling, pornography, and websites that are anathema to the family's value system.

However, these classifications are less useful if websites are not assigned to the appropriate classes. Categorizing websites at scale is a challenge. Every day, there is a very large number of new websites and URLs that come online worldwide. Websites and crawlers may not be able to scale efficiently enough to cover all of them. Heuristic-based solutions may also have shortcomings, such as the ever-changing landscape of categories. Some solutions have turned to machine learning to fill the gap. However, some machine-learning algorithms struggle with classifying outliers or minorities, such as non-obvious or unique websites. Furthermore, some languages that lack sufficient training samples may be underrepresented in ML models. AI models may similarly have shortcomings in that they require high volumes of data to operate and the models tend to drift. Over time, this leads to loss of efficiency and deprecation which may increase infrastructure and operating costs. It is therefore advantageous to provide a system and method that classifies websites according to a classification algorithm that relies on a data sketch or a probabilistic data structure. Such an ecosystem can accommodate dynamic landscapes without being limited by underrepresented languages or by the number of categories or labels or corner cases.

The system disclosed herein includes a mechanism to combine a hashing schema, such as MinHash that may be applied over a process stream of website content. The MinHash may then yield three or more probabilistic data structures, such as locality sensitive hashing (LSH) ensemble to index website hashes in a way that allows for containment queries to be executed later. The system may then aggregate the results of N indexes to produce an extrapolation of the indexed site categories into a query or unknown site.

MinHash is used herein as an example of a partial match or statistical algorithm. MinHash is not intended to provide exact one-to-one matches but rather provides a statistical probability of a match. Other partial match algorithms may also be used. This provides a data sketch that can be used with the LSH ensemble algorithm to index the websites by computing a containment percentage between the test website and the known data set. For example, the system may provide three or more LSH indexes to represent three different thresholds of containment, such as 50 percent, 30 percent, and 10 percent. Fifty percent containment roughly represents a 50 percent similarity or at least a 50 percent similarity between the test website and a known website. Similarly, the 30 percent threshold represents a roughly 30 percent similarity, and the 10 percent threshold represents a roughly 10 percent similarity. When a test website is subjected to a MinHash, then a containment threshold may be computed, and the MinHash may be inserted into the LSH index. The highest containment threshold may then be used for classification. For example, if a test website MinHash is found to be contained by a known website present in the 50% containment index, then a category of the known website may be extrapolated as the category or classification for the test website. If there is not a 50 percent index match, then a 30 percent index may be used. If there is not a 30 percent index, then a 10 percent index may be used. If there is not a 10 percent index, then the website may be subjected to additional analysis, such as via an AI algorithm or human inspection. It is anticipated that only a small minority of websites would have less than 10 percent containment, and thus most websites are expected to be classified according to this algorithm. Once the highest containment threshold index is found, it is possible that a plurality of websites may match. For example, a test website could match 10 known websites above the 50 percent containment threshold. These 10 known websites may have the same or different classifications. In the case of a multi-nominal classifier, more than one classification may be inferred from the known websites. If only a single classification is required, then a single class may be selected, such as a class that is common to a majority of the known websites or, if no majority can be found, then a simple plurality could be used.

This system may realize advantages over existing solutions. For example, web crawling may require expensive operations involving head-full or headless browser instances and/or expensive HTML parsing to retrieve content of interest that can then be used to categorize websites. Heuristic methods may also be expensive to maintain and may be human language dependent. These systems are also more difficult to automate, and models may deprecate quickly.

Machine-learning and artificial intelligence models may also be language dependent. These systems may also require high volume of data to be trained and may have difficulty learning small or underrepresented patterns, such as outliers or nonobvious sites or those that use less popular languages. It may also be costly to support AI models using neural networks with the rays of GPUs or other expensive hardware.

Human-labeling systems may not produce a significant impact on ML or AI systems because human labeling of a small number of sites may not make a sufficient difference until the pattern observed on those sites is significant enough for the ML or AI model to learn from them. For example, a human user may need to label a large number of sites, such as hundreds or thousands of sites, before an ML or AI model begins to recognize similar sites as "pharmacy" websites.

Advantageously, the system illustrated herein can benefit from a lightweight crawling method that does not require a browser instance or expensive HTML parsing. Instead, the embodiments of the system may use only plain text extracted from a GET request performed on the target site. Furthermore, this can be obtained via crowdsourcing of customer environments as users opportunistically visit websites.

Further advantageously, the system does not require heuristics or ML or AI models. This may eliminate the need of big data with constant and expensive training and the danger of model fragmentation, such as providing one model per language.

Advantageously, building a probabilistic data structure within indexes is fast and can be paralyzed and streamlined. Thus, the system may be implemented without the need of heavy infrastructure to build or operate the indexes.

The method illustrated herein uses containment queries. Containment queries can be implemented in a language-agnostic form, such as where some pairs of language-category are present in the indexes. Furthermore, the number of categories or labels may be high, and thus existing solutions may fail to provide good coverage or detection for all of the labels at the same time. The present specification provides a method that need not limit the number of categories as long as categories are represented by a few data points in the data set. Furthermore, the human labeling aspect of the present specification (e.g., to create known classifications for known websites) may provide a high return on investment. Because LSH ensemble indexes are not subject to patterns, adding a new human-labeled datapoint to the index increases the chance of accurately extrapolating the category of the next unknown site queried in the system. Each new site has the same chances of influencing the final outcome and is therefore suitable for scenarios with underrepresented languages or categories or language-category pairs.

The method illustrated herein may include a two-stage process. The first stage may be a "build" stage. In the build stage, the system builds the probabilistic data structures (i.e., the indexes) that store the existing knowledge. The existing knowledge may include data set samples that are pairs of website text and category. The website text may be extracted from known websites, and the category can then be assigned for the known category of that known website. When the process completes, the system has a working solution that can be used to run category inference or extrapolation for future unknown or previously unencountered websites.

During a runtime phase, the system queries the previously created probabilistic data structures. This includes applying the probabilistic MinHash algorithm to the outcomes to produce a precise result. In other words, given a new or unknown website that is to be classified, the process may query the indexes and assign a category to the website by extrapolating from the results returned by the N different indexes. Once a website has been classified with a sufficiently high confidence, then that classification may be added to the known data set for later usage.

A hashing or partial match algorithm may be used as part of the present method. The partial match algorithm may be considered a "fuzzy" match or one that is lower resolution than a full hash or comparison. Depending on the partial match algorithm used, the algorithm may be guaranteed to match an object that would also be matched by a full hash (i.e., no "false negatives"). Alternatively, an algorithm may be used that has some, but very few, false negatives. By design, the partial match algorithm can also have "false positives" (e.g., objects that match the partial match algorithm, but not a full-match comparison to the object). Thus, the partial match algorithm is not determinative, but returns a list of candidate objects or candidate signatures. In some embodiments, it is guaranteed (or at least highly likely) that an object or signature that would match according to a full-match algorithm will match any object that would be matched by the partial-match algorithm. Thus, "true matches" (e.g., a match that would be found by a full-match algorithm) are a subset of matches for the partial match algorithm.

One such partial match algorithm is the MinHash algorithm. Hashing itself may be considered a partial match algorithm relative to a full byte-by-byte comparison of two files. Because byte-by-byte comparison against a large number of files would be highly inefficient and create a serious performance issue, hashes are often used to identify matching files. The hash may be thought of as a lossy compression algorithm, wherein multiple binary files could yield the same hash. But the probability of two random files having the same hash is extremely small. The probability of two random files that do something useful—as opposed to two random sequences of bits—is astronomically low. Thus, various hash algorithms can be used to identify a file with near deterministic certainty.

On the other hand, MinHash does not identify an object with deterministic certainty. Generally, the resolution of a MinHash algorithm is determined by the bit size of the MinHash. A one- or two-bit MinHash would match almost every object and so would provide little advantage over a full-match algorithm. The MinHash could also be 4 bits, 16 bits, 32 bits, 64 bits, 128 bits, 256 bits, 512 bits, 1024 bits, 2048 bits, 4096, or 8192 bits, by way of illustrative and nonlimiting example. An 8192-bit MinHash would be highly specific and would have a near certainty of matching only one object. Generally, any bit depth of MinHash may be used with the present specification. In an illustrative embodiment, a 128-bit or 256-bit MinHash is used to provide a good trade-off between speed and sample size.

SELECTED EXAMPLES

The foregoing can be used to build or embody several example implementations, according to the teachings of the present specification. Some example implementations are included here as nonlimiting illustrations of these teachings.

There is disclosed an example of a computing apparatus, comprising: a hardware platform comprising a processor circuit and a memory; and instructions encoded within the memory to instruct the processor circuit to: extract human readable text from a plurality of known websites, the known websites having known categories; apply a MinHash algorithm to respective human readable text of the known websites; generate a plurality of different locality sensitive hashing (LSH) indexes for the respective websites; extract human readable text from a test website; apply the MinHash algorithm to the human readable text of the test website to provide a MinHash of the test website; query the plurality of different LSH indexes with the MinHash of the test website; and according to a result of the query, assign a category the test website, wherein the category matches a known category of at least one of the plurality of known website found to have a containment with the test website above a threshold.

There is further disclosed an example wherein the instructions are further to provide gateway services, including web content filtering according to website categories.

There is further disclosed an example wherein the instructions are further to add the test website and its assigned category to an access control list for the web content filtering.

There is further disclosed an example wherein the plurality of LSH indexes represent a plurality of containment percentage thresholds.

There is further disclosed an example wherein the plurality of LSH indexes represent 50% containment, 30% containment, and 10% containment.

There is further disclosed an example wherein 50% containment is a high confidence threshold, 30% containment is a medium confidence threshold, and 10% is a low confidence threshold.

There is further disclosed an example wherein the instructions are further to identify a plurality of known sites with a highest containment percentage selected from the plurality of containment percentage thresholds, and assign the category to the test website according to a known category assigned to a majority or a simple plurality of the plurality of known sites with the highest containment percentage.

There is further disclosed an example wherein assigning the category to the test website comprises computing a Jaccard distance between the test website and a plurality of matching websites with an LSH Ensemble containment value above a threshold and selecting a known category from a known website with a minimum Jaccard distance.

There is further disclosed an example wherein the category is a multi-nominal classifier.

There is further disclosed an example wherein the instructions are further to preprocess the human readable text extracted from the known websites and the test website before applying the MinHash algorithm.

There is further disclosed an example wherein preprocessing the human readable text extracted from the known websites comprises removing non-alphanumeric characters.

There is further disclosed an example wherein preprocessing the human readable text extracted from the known websites comprises creating histograms of a top K words from the respective known websites.

There is further disclosed an example wherein K is between 250 and 350.

There is further disclosed an example wherein K is approximately 300.

There is further disclosed an example wherein the MinHash algorithm is a 256 permutation MinHash.

There is further disclosed an example of one or more tangible, nontransitory computer-readable media having stored thereon machine-executable instructions to: identify a test website for classification; extract text from the test website; compute a MinHash on extracted text; query a plurality of N locality sensitive hashing (LSH) Ensemble indexes for known websites with the MinHash, wherein the known websites have known classifiers identify one or more websites from among the known websites, wherein the LSH Ensemble indexes indicate a containment above a threshold; and assign the test website a classifier extrapolated from a known classifier of one or more of the known websites.

There is further disclosed an example of one or more tangible, nontransitory computer-readable media of claim 16, wherein the instructions are further to: extract text from the known websites; compute MinHashes according to a MinHash algorithm on the text extracted from the known websites; and build three or more LSH Ensemble indexes per known website.

There is further disclosed an example, wherein N=3.

There is further disclosed an example, wherein the instructions are further to provide gateway services, including web content filtering according to website classifiers.

There is further disclosed an example, wherein the instructions are further to add the test website and its assigned classifier to an access control list for the web content filtering.

There is further disclosed an example, wherein the plurality of LSH indexes represent a plurality of containment percentage thresholds.

There is further disclosed an example, wherein the plurality of LSH indexes represent 50% containment, 30% containment, and 10% containment.

There is further disclosed an example, wherein 50% containment is a high confidence threshold, 30% containment is a medium confidence threshold, and 10% is a low confidence threshold.

There is further disclosed an example, wherein the instructions are further to identify a plurality of known sites with a highest containment percentage selected from the plurality of containment percentage thresholds, and assign the classifier to the test website according to a known classifier assigned to a majority or a simple plurality of the plurality of known sites with the highest containment percentage.

There is further disclosed an example, wherein assigning the classifier to the test website comprises computing a Jaccard distance between the test website and a plurality of matching websites with an LSH Ensemble containment value above a threshold, and selecting a known classifier from a known website with a minimum Jaccard distance.

There is further disclosed an example, wherein the classifier is a multi-nominal classifier.

There is further disclosed an example, wherein the instructions are further to preprocess the extracted text before applying the MinHash algorithm.

There is further disclosed an example, wherein preprocessing the extracted text comprises removing non-alphanumeric characters.

There is further disclosed an example, wherein preprocessing the extracted text comprises creating histograms of a top K words from the respective known websites.

There is further disclosed an example, wherein K is between 250 and 350.

There is further disclosed an example, wherein K is approximately 300.

There is further disclosed an example, wherein the MinHash algorithm is a 256 permutation MinHash.

There is further disclosed an example of computer-implemented method of classifying an unknown website, comprising: extracting human-readable content from a plurality of known websites, the plurality of known websites having one or more respective known classifications; preprocessing the extracted human-readable content, comprising creating respective histograms of most commonly used words for the plurality of known websites; creating three or more respective locality sensitive hashing (LSH) ensemble indexes for the known websites; extracting human-readable content from an unknown website; computing a MinHash from the extracted human-readable content of the unknown website; querying, with the computed MinHash, the three or more respective LSH ensemble indexes for the known websites; and extrapolating a classification for the unknown website based on results of the querying.

There is further disclosed an example further comprising providing gateway services, including web content filtering according to website classifiers.

There is further disclosed an example further comprising adding the unknown website and its assigned classifier to an access control list for the web content filtering.

There is further disclosed an example wherein three or more LSH ensemble indexes represent a plurality of containment percentage thresholds.

There is further disclosed an example wherein three or more LSH ensemble indexes represent 50% containment, 30% containment, and 10% containment.

There is further disclosed an example wherein 50% containment is a high confidence threshold, 30% containment is a medium confidence threshold, and 10% is a low confidence threshold.

There is further disclosed an example further comprising identifying a plurality of known sites with a highest containment percentage selected from the three or more LSH ensemble indexes and assigning the classifier to the unknown website according to a known classifier assigned to a majority or a simple plurality of the plurality of known sites with the highest containment percentage.

There is further disclosed an example wherein assigning the classifier to the unknown website comprises computing a Jaccard distance between the unknown website and a plurality of matching websites with an LSH Ensemble containment value above a threshold and selecting a known classifier from a known website with a minimum Jaccard distance.

There is further disclosed an example wherein the classifier is a multi-nominal classifier.

There is further disclosed an example further comprising preprocessing the extracted human-readable content before creating the LSH ensemble indexes.

There is further disclosed an example wherein preprocessing the extracted human-readable content comprises removing non-alphanumeric characters.

There is further disclosed an example wherein preprocessing the extracted human-readable content comprises creating histograms of a top K words from the known websites.

There is further disclosed an example wherein K is between 250 and 350.

There is further disclosed an example wherein K is approximately 300.

There is further disclosed an example wherein computing the MinHash comprises computing a 256 permutation Min-Hash.

There is further disclosed an example of an apparatus comprising means for performing the method.

There is further disclosed an example wherein the means for performing the method comprise a processor and a memory.

There is further disclosed an example wherein the memory comprises machine-readable instructions that, when executed, cause the apparatus to perform the method.

There is further disclosed an example wherein the apparatus is a computing system.

At least one computer readable medium comprising instructions that, when executed, implement a method or realize an apparatus as claimed.

DETAILED DESCRIPTION OF THE DRAWINGS

A system and method for website classification via containment queries will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Protected enterprise 102 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

User 120 may wish to access a number of websites 184. When user 120 accesses website 184 via client device 110, gateway 108 may intercept the request and determine whether user 120 is authorized to access the desired website. For example, gateway 108 may have an access control list (ACL) that restricts access to certain categories of websites. Gateway 108 may contract with security services provider 190 to determine which categories particular URLs belong to. For example, gateway 108 may restrict access to certain classes of websites, such as gambling, illegal activities, pornography, or other websites the user 120 should not be allowed to access either because of corporate or enterprise policy or because of a family policy. Furthermore, certain categories of websites are more likely to host malware. For example, piracy websites are notorious for providing malware, which may permit attacker 180 to gain access to certain features of protected enterprise 102. Gateway 108 needs to website categories from security services provider 190 so they can provide web filtering.

Figure 2:
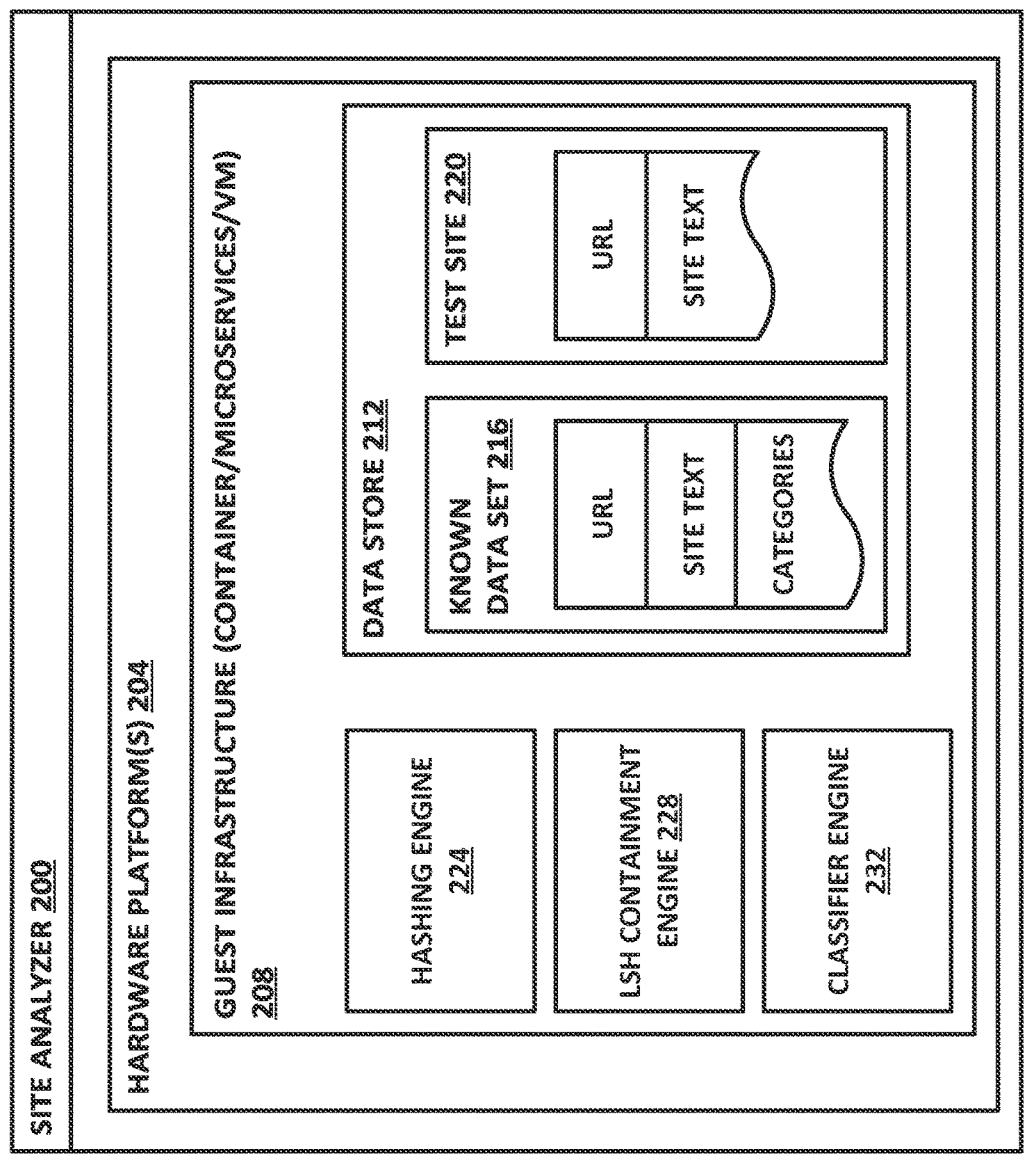
FIG. 2 is a block diagram of selected elements of a site analyzer.

FIG. 2 is a block diagram of selected elements of a site analyzer 200. Site analyzer 200 may be implemented in a data center, as a cloud service, on a dedicated appliance, or via some other suitable infrastructure.

Figure 7:
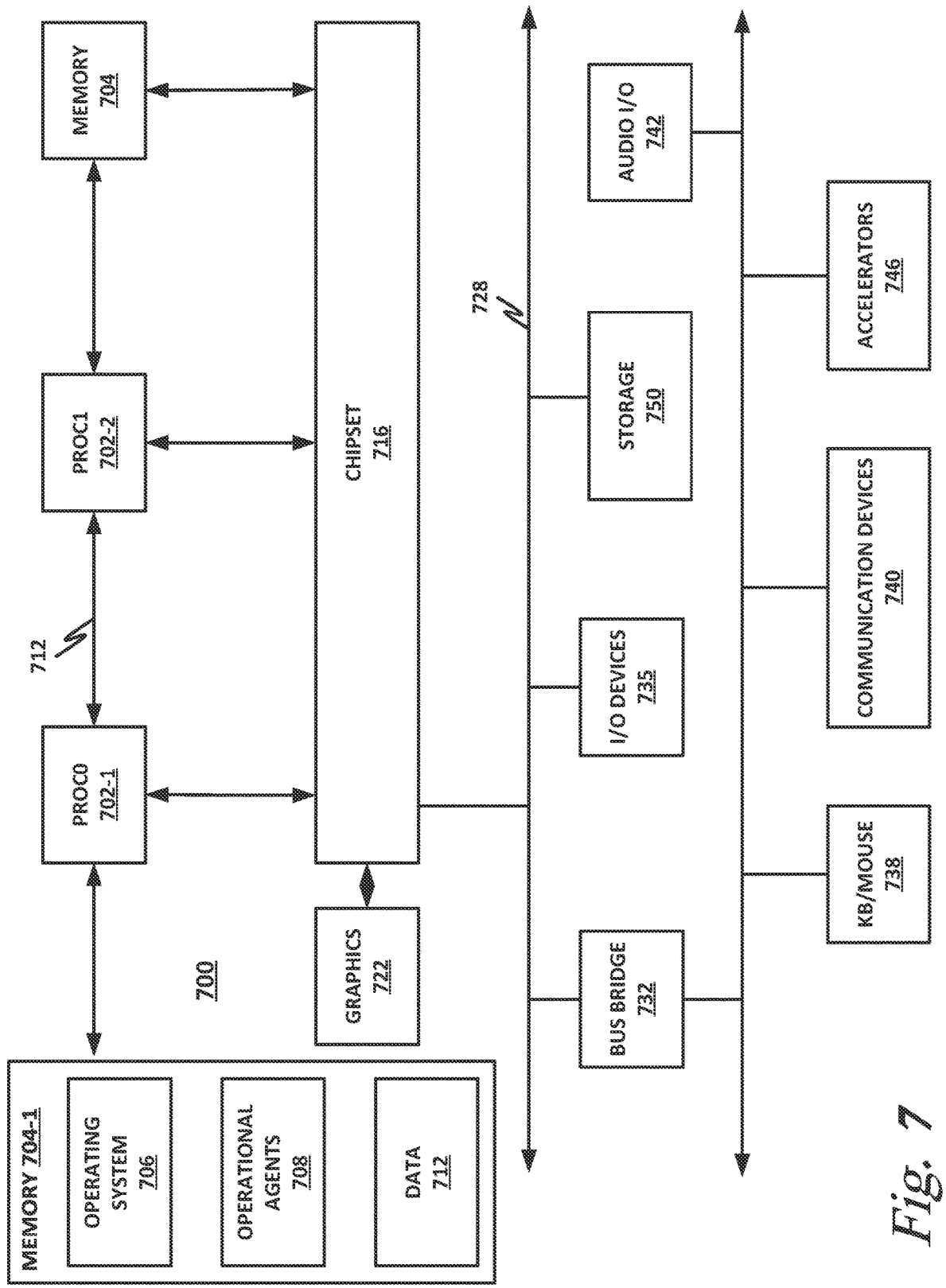
FIG. 7 is a block diagram of selected elements of a hardware platform.

Site analyzer 200 includes one or more hardware platforms 204. Hardware platforms 204 may be, for example, a hardware platform as illustrated in FIG. 7 below or some other suitable hardware platform. Hardware platform 204 provides the necessary hardware infrastructure to execute the functions of site analyzer 200. This may include executing software or firmware or executing special-purpose hardware, such as in an application-specific integrated circuit (ASIC).

Figure 8:
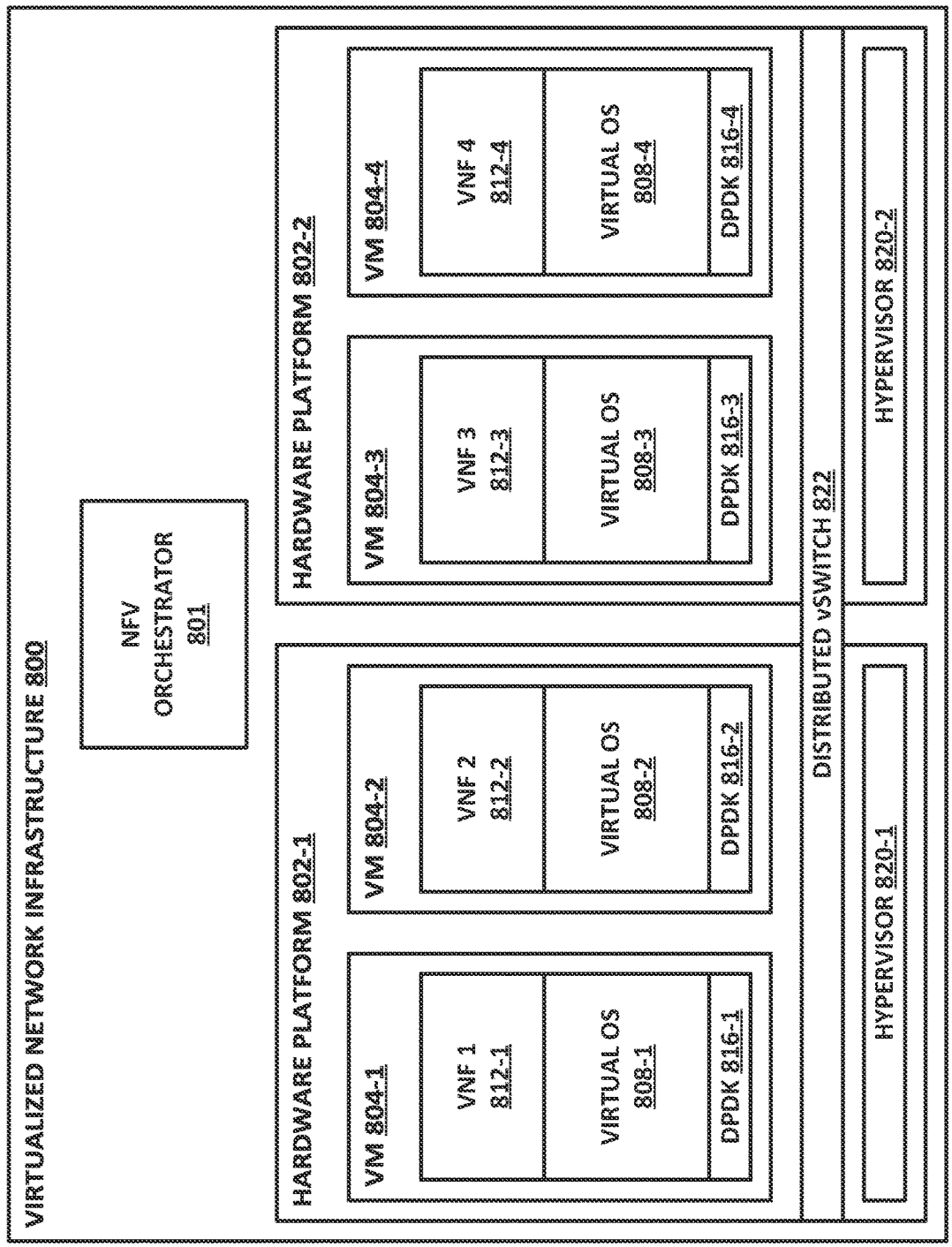
FIG. 8 is a block diagram of selected elements of a network function virtualization (NFV) infrastructure.
Figure 9:
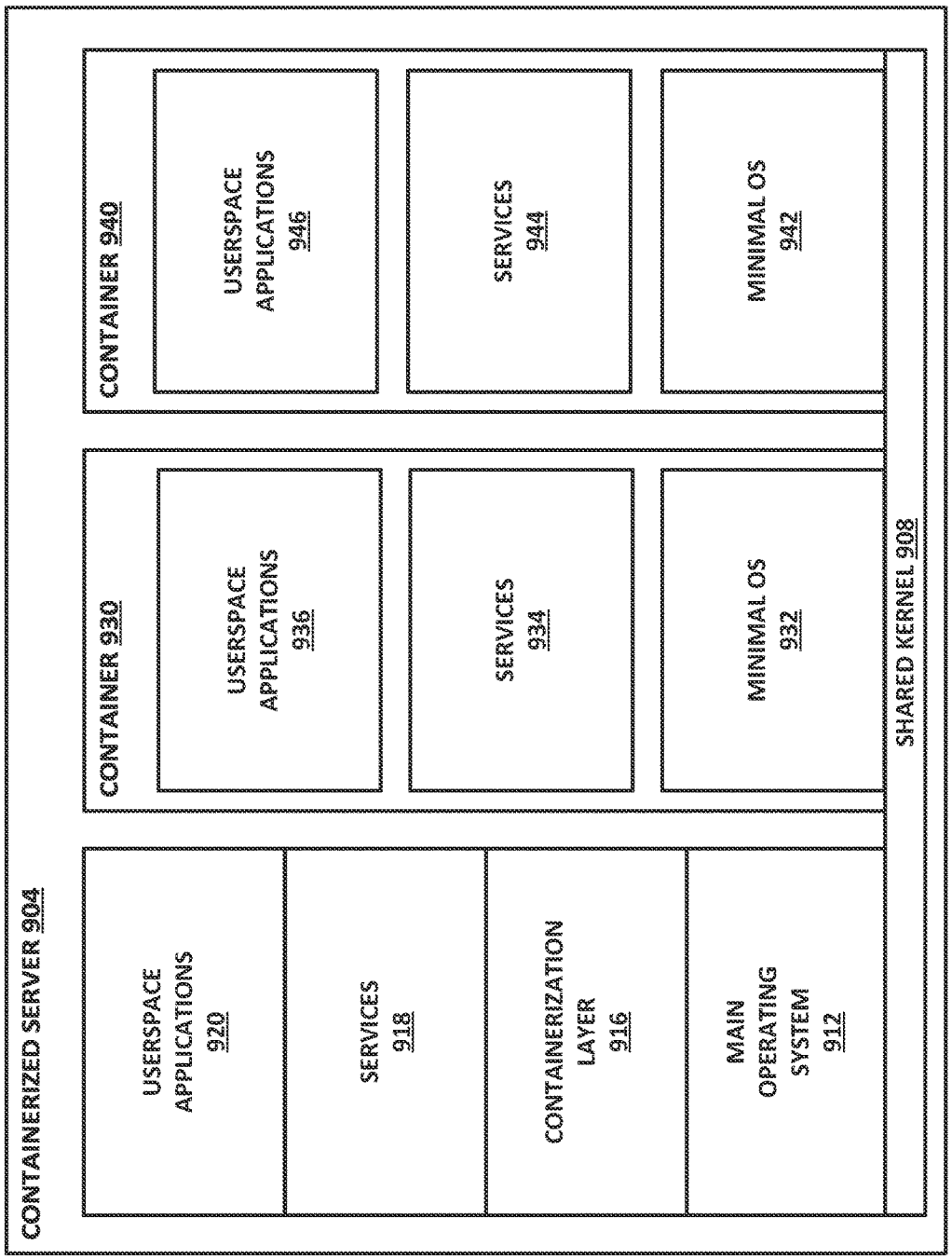
FIG. 9 is a block diagram of selected elements of a containerization infrastructure.

Site analyzer 200 may also include a guest infrastructure 208. Guest infrastructure 208 may include, for example, containers, micro services, virtual machines, or other infrastructure to run various discrete functions. In modern computing practice, it is common to divide workloads into discrete units or microservices and to implement each discrete micro service in a separate container, virtual machine, or other. Thus, guest infrastructure 208 may provide the necessary infrastructure for this architecture. FIG. 8 below illustrates an example of a virtualized network infrastructure that may be used for hosting virtual machines. FIG. 9 below illustrates a containerization infrastructure that may be useful for providing containers.

Site analyzer 200 includes a number of logical functions which are illustrated herein as separate blocks. It should be noted that the functions illustrated herein may be provided as discrete containers, VMs, or other discrete units, or in a single unit. In appropriate embodiments, some functions may be omitted, while in other embodiments, additional functions may be provided.

In this example, a hashing engine 224 is provided to implement a partial match algorithm. MinHash is illustrated herein as an example of a partial match algorithm. However, hashing engine 224 could also provide any other partial match algorithm or statistical algorithm. As discussed above, the algorithm may tolerate a number of false positives. Depending on the algorithm and its sensitivity, the algorithm may be expected to return zero or few false positives. Thus, "true" matches may be expected to be found within results returned by the hashing algorithm implemented by hashing engine 224.

LSH containment engine 228 may be provided to compute the LSH containment algorithm. This may query an LSH index with the MinHash results to determine a containment percentage as illustrated in this specification.

A data store 212 may include a database of objects and metadata about the objects. For example, a known data set 216 may include a plurality of fields, such as a URL for a site, site text, or in other words, human readable text extracted from the site, and one or more known categories for the site.

Data store 212 may also receive one or more test sites 220. Test sites 220 are sites that have been identified for analysis but that may not yet have a reliable classification. Thus, test site 220 may include fields, such as the URL and the extracted site text. Site analyzer 200 may operate various functions, such as hashing engine 224 and LSH containment engine 228 to classify test site 220 such as by identifying one or more known sites within the known data set 216 and determining an LSH containment. For example, hashing engine 224 may perform a MinHash on the site text of test site 220. It may then insert the MinHash into an LSH index via LSH containment engine 228. In some cases, data store 212 may maintain a plurality of LSH indexes for each known website. The LSH indexes may include three or more indexes that represent three or more different thresholds for containment. In this example, there are three containment indexes, namely a 50 percent containment index, a 30 percent containment index, and a 10 percent containment index. When site analyzer 200 identifies one or more known websites with containment above a threshold for test website 220, the site analyzer 220. Classifier engine 232 may extrapolate a classification, such as by assigning to test site 220 the same class as a known website with a containment index above a threshold.

Figure 3:
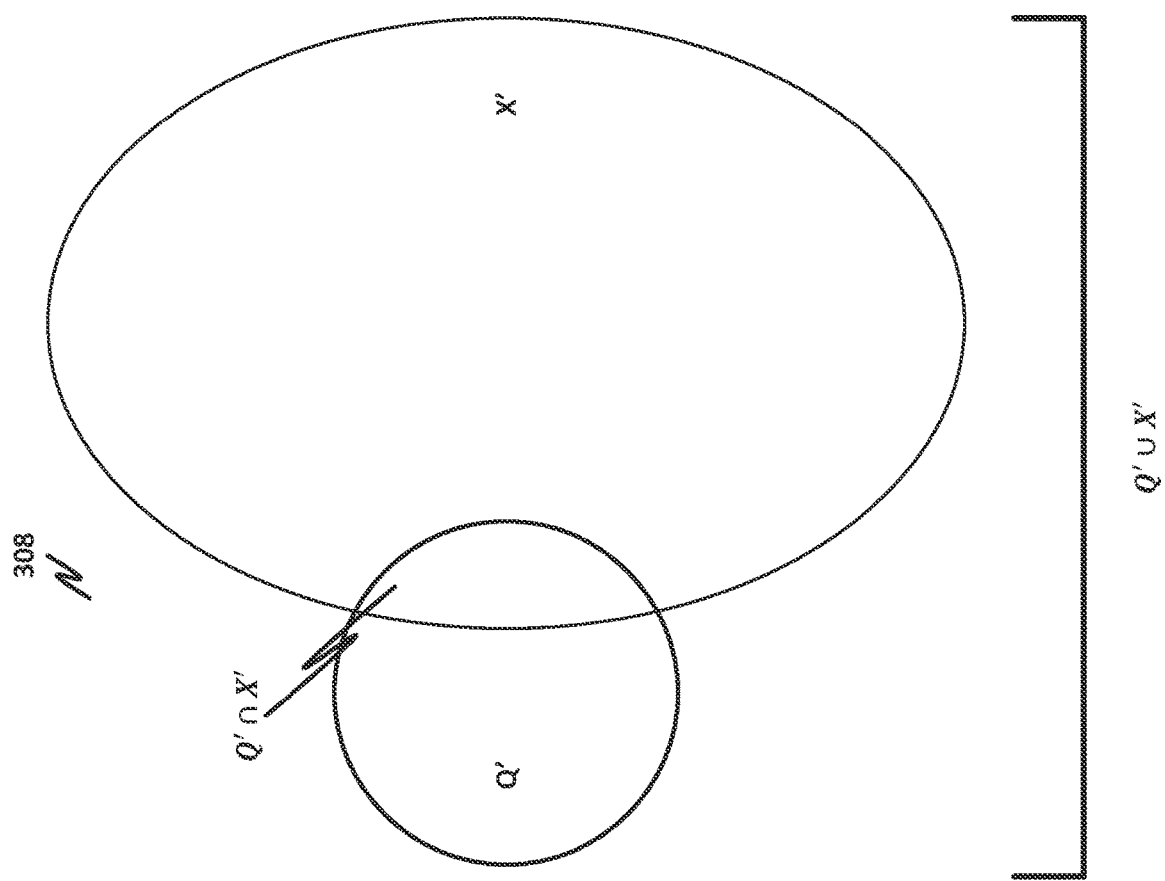
FIG. 3 is a Venn diagram illustration of selected aspects of a containment ecosystem.
Figure 3:
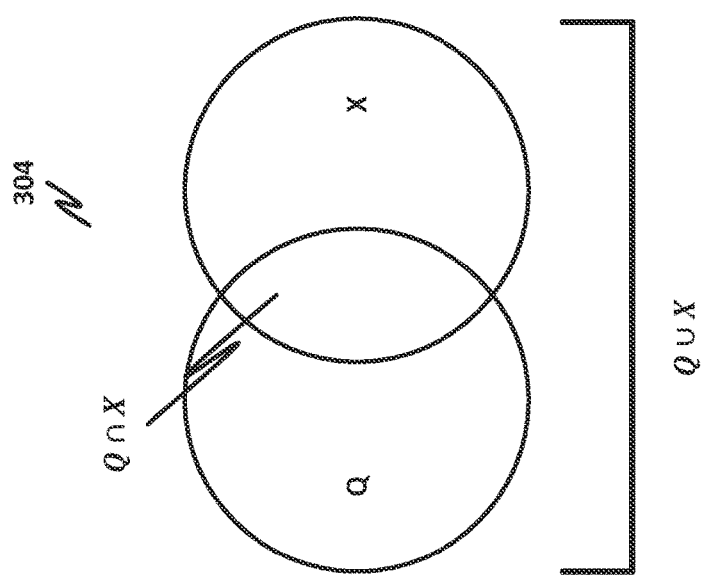

FIG. 3 is a Venn diagram illustration of selected aspects of a containment ecosystem. Diagram 304 illustrates two sets, Q and X. The overlap (or intersection) between the two sets is shows as the region Q ∩ X. This represents values that are in both sets Q and X. The union of the two sets is shown as Q ∪ X, or in other words, the values that appear in either set. Thus, the intersection may represent "Q AND X" while the union may represent "Q OR X."

The Jaccard similarity coefficient may be written as $J(Q,X)=|Q \cap X|/|Q \cup X|$. One challenge with the Jaccard index is that the second set can have an outsize influence on the result. This is evident in diagram 308, which includes sets Q' and X'.

In this case, J(Q'X') may be skewed because X' is much larger than Q'. This skewing can be problematic, for example, in classifying web sites, as the total volume of web sites in the world (i.e., X') is in the billions.

For some applications, the containment index may represent a more useful computation. The containment index is computed as $C(Q,X)=|Q \cap X|/|Q|$. This containment index is less sensitive to the size of the second set, and thus the results for $C(Q',X')$ are less skewed than with the Jaccard index. Thus, embodiments of LSH Ensemble use the Containment index as a data sketch.

Figure 4:
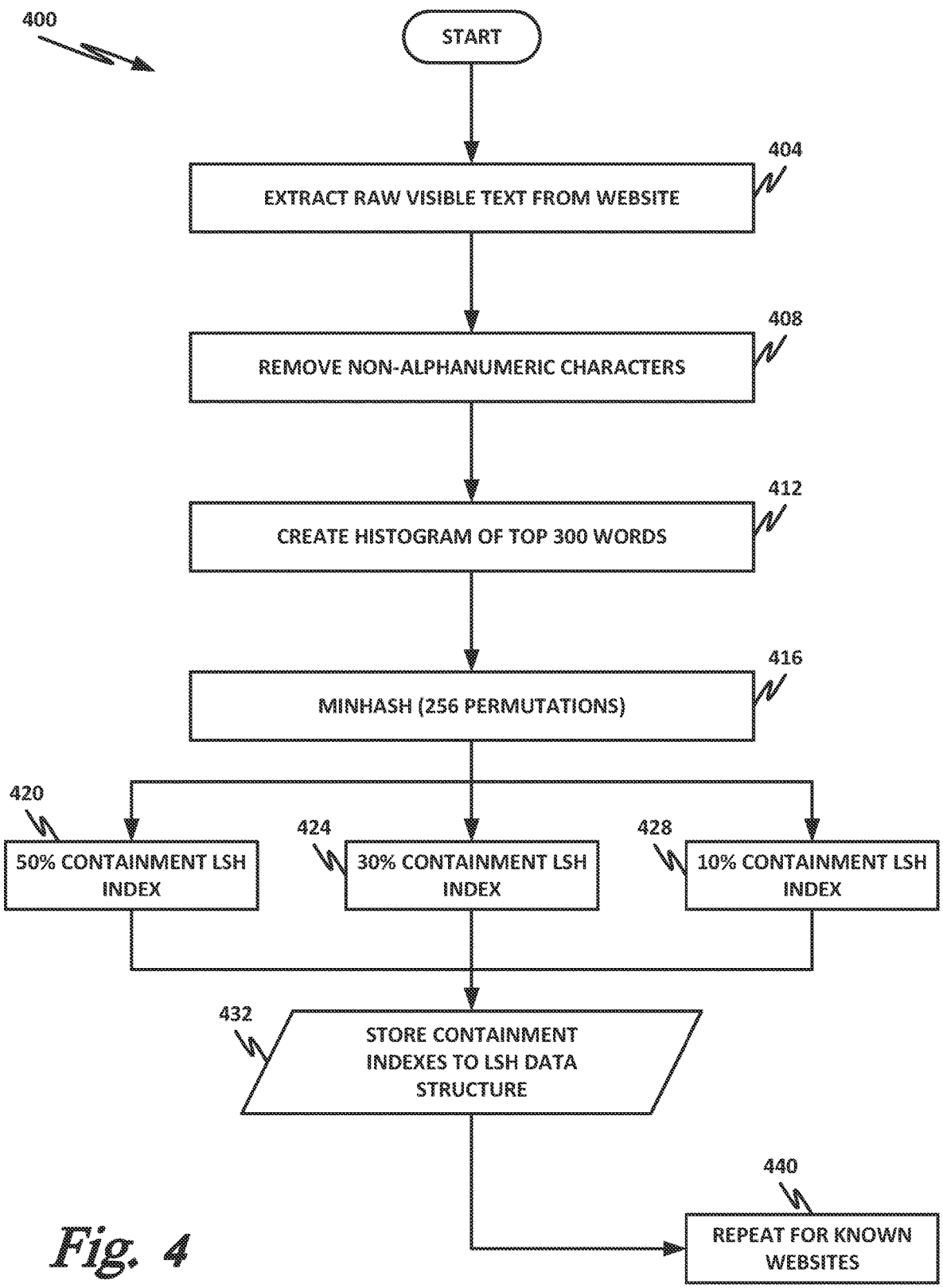
FIG. 4 is a flowchart of a method of processing a known data set.

FIG. 4 is a flowchart of a method 400 of processing a known data set.

As discussed above, the method disclosed herein may be thought of in two stages. In a build stage, the LSH containment indexes are built for a set of known websites with known classifiers. In a runtime stage, MinHashes for one or more unknown or new websites are inserted into the LSH containment indexes to determine containment thresholds. FIG. 4 is a flowchart of selected aspects of the build phase.

Starting in block 404, raw and visible text from each website may be extracted. This extracted text may form a data set or ground truth, which may be used to create indexes. In this method, it is assumed that categories for these websites are already known. These known websites with known categories are used as the ground truth for the LSH containment computation. This may include a number of websites that have been hand categorized by human operators and may thus have high confidence classifications.

In block 408, once the data have been extracted, some data preprocessing may be performed. The data preprocessing may be used to simplify the analysis and ensure that the data processed are genuinely representative of the website. For example, in one embodiment, the system may remove nonalphanumeric characters from the text stream. This is because nonalphanumeric characters are less likely to affect a human perceptible classification for the website. Even where nonalphanumeric characters may affect the classification, the system may usefully classify the site without those characters.

In block 412, additional preprocessing may be performed. For example, after removing nonalphanumeric characters, the extracted text may be divided into discrete words. The system may then create a histogram of the top K words. In various embodiments, K may be any suitable integer such as a value between 250 and 350 words, and in a particular embodiment, K may be approximately 300 words.

In block 416, once the text data are ready, the data may be processed by computing a MinHash. A MinHash is based on a hashing algorithm that aims to maximize collision chances and therefore is useful for finding similar items based on the Jaccard distance that can be computed among them. By way of illustration, a 256 permutation MinHash may be used. Other variants may use more or fewer permutations depending on the desired trade-off between complexity and precision. A higher number of permutations generally provides higher complexity, such as a greater footprint, more memory or CPU consumption, and more time but also provides greater precision. A lower number of permutations generally provides lower complexity and less resource consumption but less precision. In this example, precision may be thought of as the number of false positives. The greater number of permutations, the less likelihood that any number of false negatives will occur, and the fewer number of false positives will be expected to be returned. Lower precision results in a greater chance of returning false negatives and a larger number of false positives.

After the sample has been MinHashed, the MinHash may be inserted along with the respective website category into N different LSH ensemble indexes. In this example, three different indexes are used. An LSH ensemble index is a probabilistic data structure that services containment queries. In other words, given a test sample, the system can query the index for samples that contain X percent of the test sample content, in this case a website. X may be defined at design time when the index is created. Generally, this value cannot be changed once the index has been created. Because of this limitation, the system provides N different indexes operating at N different containment thresholds. For example, in block 420, a 50 percent containment LSH index is provided. In block 424, a 30 percent containment LSH index is provided. In block 428, a 10 percent containment LSH index is provided.

Index 420 will only return samples that are stored in the index and that contain 50 percent or more of the test sample content. Similarly, index 424 will only return samples that contain 30 percent or more of the test sample content. Index 428 will only return samples that have at least 10 percent containment.

Because there is a logical connection between the percentage of containment and the precision of results, results returned may be classified by these indexes as different confidence intervals. For example, in trying to find a category for a test sample, the 50 percent containment index will return results with a high confidence in comparison. The results returned by the 10 percent containment index will have a lower confidence indicated by little overlap. The 30 percent containment index will represent a medium confidence classification.

In block 432, the system stores the containment indexes to an LSH data structure.

In block 440, the method is repeated for each of the known websites in the data set. For example, if the data set contains 100,000 known websites with each one having a known category or categories, then method 400 will be repeated for each one of those known websites.

Figure 5:
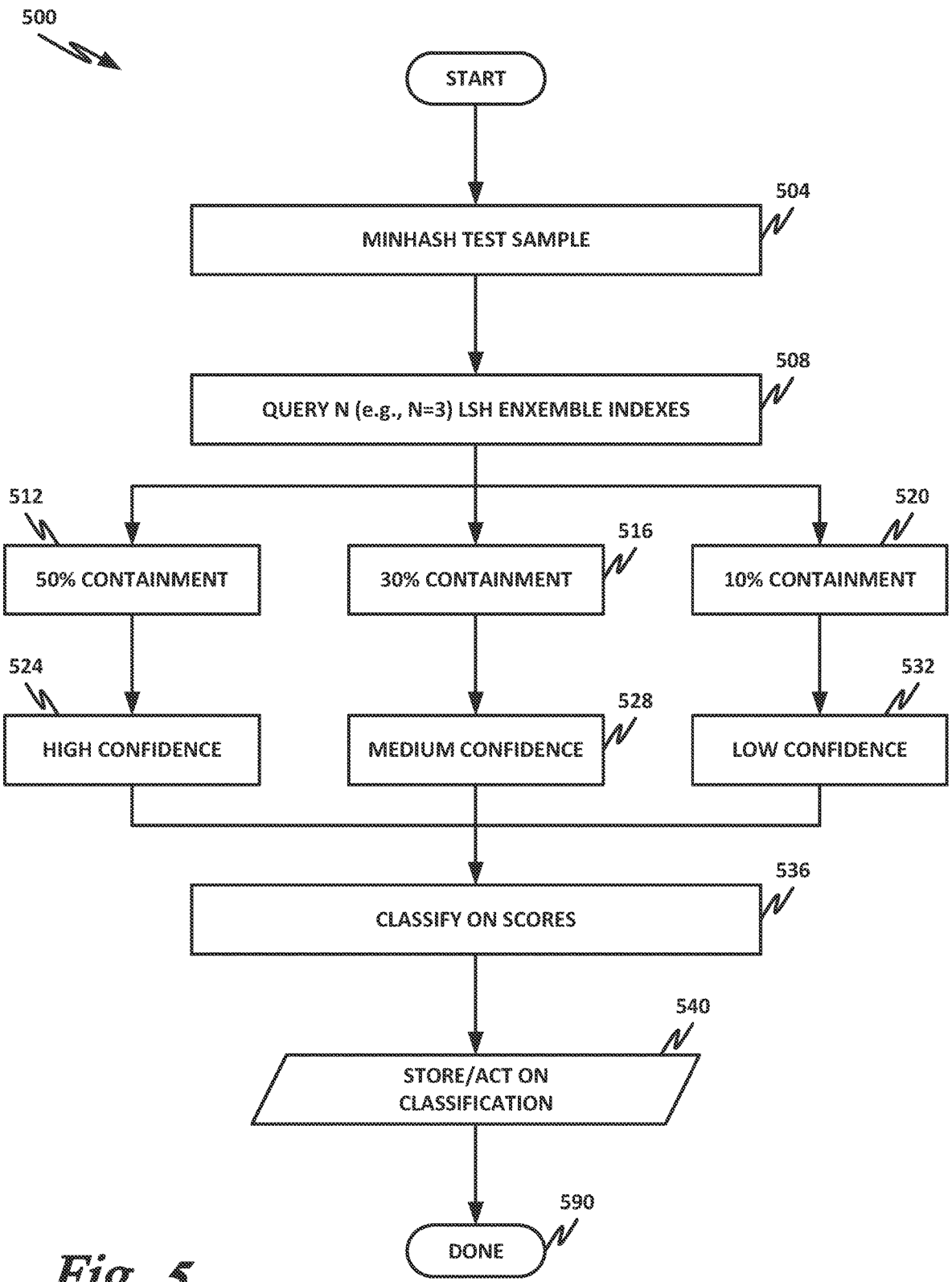
FIG. 5 is a flowchart of method of classifying an unknown website using the containment indexes built.

FIG. 5 is a flowchart of method 500 of classifying an unknown website using the containment indexes built, such as by method 400 of FIG. 4.

Method 500 may be used to operate on a single test sample and may be repeated for each website that needs to be classified. Starting in block 504, the system extracts raw text from the website and may optionally perform preprocessing as illustrated in blocks 404, 408, and 412 of FIG. 4. The system may then perform a MinHash on the test sample or on the extracted data.

In block 508, the system queries the N LSH ensemble indexes. In this example, N equals three. As illustrated in FIG. 4, the three indexes represent 50 percent containment, 30 percent containment, and 10 percent containment, respectively.

After querying the LSH indexes, the results may indicate one or more of 50 percent containment in block 512, 30 percent containment in block 516, or 10 percent containment in block 520. Based on the containment returned, a confidence threshold may be returned as well. For example, 50 percent containment may result in high confidence in block 524, 30 percent containment may result in medium confidence in block 528, 10 percent containment may result in low confidence in block 532.

In block 536, the system may then classify the test website based on the scores. A system analyst may determine which summarization algorithm works best for a particular problem. One possible criterion is to simply assign the category of the majority of the results returned by the 50 percent containment index first. For example, if the 50 percent containment index returns 10 known websites and 5 of them have the same class, then that class may also be applied to the test sample. If results from the 50 percent containment index are not available, then the system may proceed to select a category of majority of results returned by the 30 percent containment index. If the 30 percent containment results are not available, then the system may select a category of the majority of results returned by the 10 percent containment index. If a 10 percent containment index is not returned, then the classification may fail.

Another possible criterion is to measure the Jaccard distance between the test samples and the results returned by the indexes. The system may then assign the category of the website that maintains the minimum Jaccard distance between the test sample and the returned websites. For example, if the 50 percent containment index returns 10 websites, the system may compute a Jaccard distance between the test sample and each of the 10 returned websites and select a category from the known website with the minimum Jaccard distance.

Figure 6:
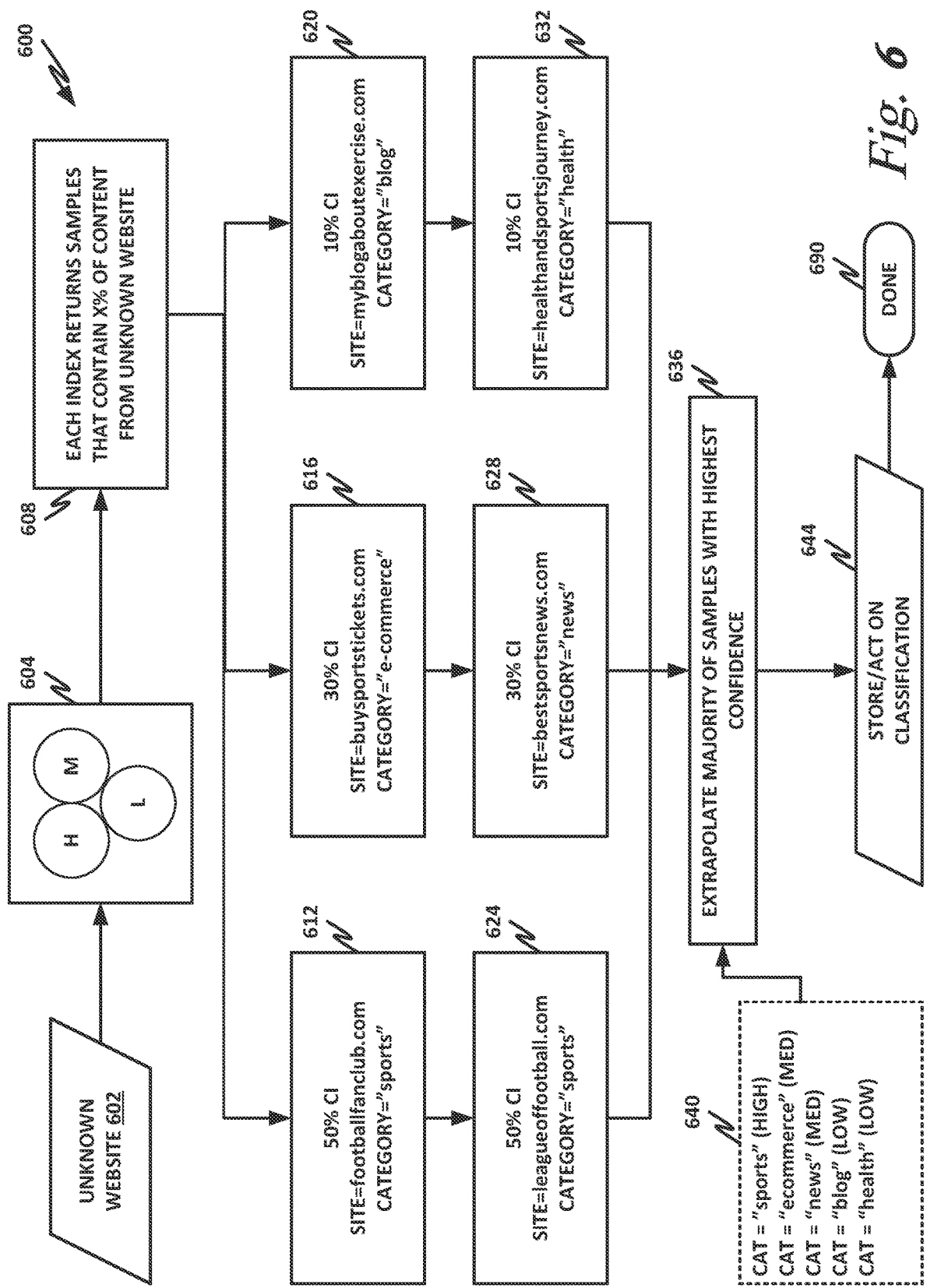
FIG. 6 is a block diagram of selected elements of a processing pipeline illustrating aspects of the runtime phase illustrated herein.

FIG. 6 is a block diagram of selected elements of a processing pipeline illustrating aspects of the runtime phase illustrated herein. In block 602, the system receives an unknown website.

In block 604, the system may then query high, medium, and low confidence LSH indexes to determine a containment between the unknown website 602 and the set of known websites with known reputations.

In block 608, each index returns samples that contain X percent of the content from the unknown website. For example, X may be 50 percent, 30 percent, 10 percent, or other percentages, including 90 percent, 80 percent, 70 percent, 60 percent, 50 percent, 40 percent, 30 percent, 20 percent, 10 percent, or any other suitable containment threshold. The higher the containment threshold, the greater the confidence in the match.

Results for various illustrative known websites may then be returned. For example, in block 612, unknown website 602 is found to have a 50 percent containment index with the site footballfanclub.com. Footballfanclub.com is categorized as a sports website. Similarly, in block 624, unknown website 602 is found to have a 50 percent containment index with the site leagueoffootball.com in the category "sports."

In block 616, unknown website 602 is found to have a 30 percent containment index with the site buysportstickets.com, which is categorized as an e-commerce site. Furthermore, unknown website 602 is found to have a 30 percent containment index with the site bestsportsnews.com, which is in the category "news."

In block 620, unknown website 602 is found to have a 10 percent containment index with the site myblogaboutexercise.com, which is in the category "blog."

In block 632, unknown website 602 is found to have a 10 percent containment index with the site healthandsportsjourney.com in the category "health."

Note that, in the case of multinominal classifiers, a sport such as buysportstickets.com, could have multiple classes, such as "e-commerce" and "sports." Sites could also have more specific categories. For example, the site bestsportsnews.com could have the more specific category of "sports news."

In block 636, the system extrapolates a majority of samples with the highest confidence. In this case, the system is found to have the category "sports" with high confidence because both of the results at the 50 percent confidence index also had the category "sports." The categories "e-commerce" and "news" are found with medium confidence based on the 30 percent containment index. The categories "blog" and "health" are found with low confidence based on the 10 percent containment index. These categories and confidence levels are illustrated in block 640.

Because sites were found in the 50 percent containment index, in one illustrative example, the class for unknown website 602 may be extrapolated from the sites in the 50 percent containment index. If all of the sites have the same class as illustrated here, then that class may be assigned to unknown website 602. If different classes are found within the same containment index, then a class from a majority or a simple plurality of sites in that containment index may be used. In the case of a multinominal classifier, all of the results may be returned with their associated confidence levels. For example, the system could assign the category "sports" with high conference, the categories "e-commerce" and "news" with medium confidence, and the categories "blog" and "health" with low confidence.

In block 644, the system may store and act on the classification. For example, in the case of web content filtering, the classification may be sent to a security services provider. When a user operating a home gateway attempts to access a site, the home gateway may query the security services provider for a known category or classification for the URL being accessed. This could be provided, for example, via a database such as the McAfee GTI database. Once the security services provider has returned the appropriate classification, the home gateway may determine how to act on that classification, such as by allowing access, blocking access, warning the user, logging access, warning a site administrator, or taking some other action.

In block 690, the method is done.

FIG. 7 is a block diagram of a hardware platform 700. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processor units (CPU).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with a processor 702 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, a data storage device 744, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more nontransitory computer-readable mediums having stored thereon executable instructions operable to instruct a processor to provide operational functions. At an appropriate time, such as upon booting hardware platform 700 or upon a command from operating system 706 or a user or security administrator, a processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor (s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

FIG. 8 is a block diagram of a NFV infrastructure 800. NFV is an example of virtualization, and the virtualization infrastructure here can also be used to realize traditional VMs. Various functions described above may be realized as VMs, such as various functions of site analyzer 200 of FIG. 2 above.

NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 800. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 8, an NFV orchestrator 801 may manage several VNFs 812 running on an NFVI 800. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 801 a valuable system resource. Note that NFV orchestrator 801 may provide a browser-based or graphical configuration interface, and in some embodiments may be integrated with SDN orchestration functions.

Note that NFV orchestrator 801 itself may be virtualized (rather than a special-purpose hardware appliance). NFV orchestrator 801 may be integrated within an existing SDN system, wherein an operations support system (OSS) manages the SDN. This may interact with cloud resource management systems (e.g., OpenStack) to provide NFV orchestration. An NFVI 800 may include the hardware, software, and other infrastructure to enable VNFs to run. This may include a hardware platform 802 on which one or more VMs 804 may run. For example, hardware platform 802-1 in this example runs VMs 804-1 and 804-2. Hardware platform 802-2 runs VMs 804-3 and 804-4. Each hardware platform 802 may include a respective hypervisor 820, virtual machine manager (VMM), or similar function, which may include and run on a native (bare metal) operating system, which may be minimal so as to consume very few resources. For example, hardware platform 802-1 has hypervisor 820-1, and hardware platform 802-2 has hypervisor 820-2.

Hardware platforms 802 may be or comprise a rack or several racks of blade or slot servers (including, e.g., processors, memory, and storage), one or more data centers, other hardware resources distributed across one or more geographic locations, hardware switches, or network interfaces. An NFVI 800 may also include the software architecture that enables hypervisors to run and be managed by NFV orchestrator 801.

Running on NFVI 800 are VMs 804, each of which in this example is a VNF providing a virtual service appliance. Each VM 804 in this example includes an instance of the Data Plane Development Kit (DPDK) 816, a virtual operating system 808, and an application providing the VNF 812. For example, VM 804-1 has virtual OS 808-1, DPDK 816-1, and VNF 812-1. VM 804-2 has virtual OS 808-2, DPDK 816-2, and VNF 812-2. VM 804-3 has virtual OS 808-3, DPDK 816-3, and VNF 812-3. VM 804-4 has virtual OS 808-4, DPDK 816-4, and VNF 812-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 8 shows that a number of VNFs 804 have been provisioned and exist within NFVI 800. This FIGURE does not necessarily illustrate any relationship between the VNFs and the larger network, or the packet flows that NFVI 800 may employ.

The illustrated DPDK instances 816 provide a set of highly-optimized libraries for communicating across a virtual switch (vSwitch) 822. Like VMs 804, vSwitch 822 is provisioned and allocated by a hypervisor 820. The hypervisor uses a network interface to connect the hardware platform to the data center fabric (e.g., a host fabric interface (HFI)). This HFI may be shared by all VMs 804 running on a hardware platform 802. Thus, a vSwitch may be allocated to switch traffic between VMs 804. The vSwitch may be a pure software vSwitch (e.g., a shared memory vSwitch), which may be optimized so that data are not moved between memory locations, but rather, the data may stay in one place, and pointers may be passed between VMs 804 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 822 is illustrated, wherein vSwitch 822 is shared between two or more physical hardware platforms 802.

FIG. 9 is a block diagram of selected elements of a containerization infrastructure 900. Like virtualization, containerization is a popular form of providing a guest infrastructure. Various functions described herein may be containerized, such as any of the functions of site analyzer 200 of FIG. 2 above.

Containerization infrastructure 900 runs on a hardware platform such as containerized server 904. Containerized server 904 may provide processors, memory, one or more network interfaces, accelerators, and/or other hardware resources.

Running on containerized server 904 is a shared kernel 908. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 908 is main operating system 912. Commonly, main operating system 912 is a Unix or Linux-based operating system, although containerization infrastructure is also available for other types of systems, including Microsoft Windows systems and Macintosh systems. Running on top of main operating system 912 is a containerization layer 916. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer (e.g., Docker) versus one without a daemon (e.g., Podman). Such debates are outside the scope of the present specification, and when the present specification speaks of containerization, it is intended to include any containerization layer, whether it requires the use of a daemon or not.

Main operating system 912 may also provide services 918, which provide services and interprocess communication to userspace applications 920.

Services 918 and userspace applications 920 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 912, they inherit the same file and resource access permissions as those provided by shared kernel 908. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 904, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 904).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 904 hosts two containers, namely container 930 and container 940.

Container 930 may include a minimal operating system 932 that runs on top of shared kernel 908. Note that a minimal operating system is provided as an illustrative example, and is not mandatory. In fact, container 930 may perform as full an operating system as is necessary or desirable. Minimal operating system 932 is used here as an example simply to illustrate that in common practice, the minimal operating system necessary to support the function of the container (which in common practice, is a single or monolithic function) is provided.

On top of minimal operating system 932, container 930 may provide one or more services 934. Finally, on top of services 934, container 930 may also provide userspace applications 936, as necessary.

Container 940 may include a minimal operating system 942 that runs on top of shared kernel 908. Note that a minimal operating system is provided as an illustrative example, and is not mandatory. In fact, container 940 may perform as full an operating system as is necessary or desirable. Minimal operating system 942 is used here as an example simply to illustrate that in common practice, the minimal operating system necessary to support the function of the container (which in common practice, is a single or monolithic function) is provided.

On top of minimal operating system 942, container 940 may provide one or more services 944. Finally, on top of services 944, container 940 may also provide userspace applications 946, as necessary.

Using containerization layer 916, containerized server 904 may run discrete containers, each one providing the minimal operating system and/or services necessary to provide a particular function. For example, containerized server 904 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The foregoing detailed description sets forth examples of apparatuses, methods, and systems relating to a system for website classification via containment queries, in accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to am embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without the specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing h1 unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
   a hardware platform comprising a processor circuit and a memory; and
   instructions encoded within the memory to instruct the processor circuit to:
   extract human readable text from a plurality of known websites, the known websites having known categories;
   apply a MinHash algorithm to respective human readable text of the known websites;
   generate a plurality of different locality sensitive hashing (LSH) indexes for the respective websites;
   extract human readable text from a test website;
   apply the MinHash algorithm to the human readable text of the test website to provide a MinHash of the test website;
   containment query the plurality of different LSH indexes with the MinHash of the test website, wherein a containment query is computed according to an intersection of two sets; and
   according to a result of the query, assign a category the test website, wherein the category matches a known category of at least one of the plurality of known website found to have a containment with the test website above a threshold.

2. The computing apparatus of claim 1, wherein the instructions are further to provide gateway services, including web content filtering according to website categories.

3. The computing apparatus of claim 1, wherein the plurality of LSH indexes represent a plurality of containment percentage thresholds.

4. The computing apparatus of claim 3, wherein the plurality of LSH indexes represent 50% containment, 30% containment, and 10% containment.

5. The computing apparatus of claim 4, wherein 50% containment is a high confidence threshold, 30% containment is a medium confidence threshold, and 10% is a low confidence threshold.

6. The computing apparatus of claim 3, wherein the instructions are further to identify a plurality of known sites with a highest containment percentage selected from the plurality of containment percentage thresholds, and assign the category to the test website according to a known category assigned to a majority or a simple plurality of the plurality of known sites with the highest containment percentage.

7. The computing apparatus of claim 1, wherein assigning the category to the test website comprises computing a Jaccard distance between the test website and a plurality of matching websites with an LSH Ensemble containment value above a threshold, and selecting a known category from a known website with a minimum Jaccard distance.

8. The computing apparatus of claim 1, wherein the instructions are further to preprocess the human readable text extracted from the known websites and the test website before applying the MinHash algorithm, comprising removing non-alphanumeric characters and creating histograms of a top K words from the known websites.

9. The computing apparatus of claim 8, wherein K is approximately 300.

10. The computing apparatus of claim 1, wherein the MinHash algorithm is a 256 permutation MinHash.

11. One or more tangible, nontransitory computer-readable media having stored thereon machine-executable instructions to:
    identify a test website for classification;
    extract text from the test website;
    compute a MinHash on extracted text according to a MinHash algorithm;
    containment query a plurality of N locality sensitive hashing (LSH) Ensemble indexes for known websites with the MinHash, wherein a containment query is computed according to an intersection of two sets, wherein the known websites have known classifiers identify one or more websites from among the known websites, wherein the LSH Ensemble indexes indicate a containment above a threshold; and
    assign the test website a classifier extrapolated from a known classifier of one or more of the known websites.

12. The one or more tangible, nontransitory computer-readable media of claim 11, wherein the instructions are further to:
    extract text from the known websites;
    compute MinHashes according to a MinHash algorithm on the text extracted from the known websites; and
    build three or more LSH Ensemble indexes per known website.

13. The one or more tangible, nontransitory computer-readable media of claim 11, wherein N=3.

14. The one or more tangible, nontransitory computer-readable media of claim 11, wherein the plurality of LSH indexes represent a plurality of containment percentage thresholds.

15. The one or more tangible, nontransitory computer-readable media of claim 14, wherein the plurality of LSH indexes represent 50% containment, 30% containment, and 10% containment.

16. The one or more tangible, nontransitory computer-readable media of claim 15, wherein 50% containment is a high confidence threshold, 30% containment is a medium confidence threshold, and 10% is a low confidence threshold.

17. The one or more tangible, nontransitory computer-readable media of claim 11, wherein the MinHash algorithm is a 256 permutation MinHash.

18. A computer-implemented method of classifying an unknown website, comprising:
    extracting human-readable content from a plurality of known websites, the plurality of known websites having one or more respective known classifications;
    preprocessing the extracted human-readable content, comprising creating respective histograms of most commonly used words for the plurality of known websites;
    creating three or more respective locality sensitive hashing (LSH) ensemble indexes for the known websites;
    extracting human-readable content from an unknown website;
    computing a MinHash from the extracted human-readable content of the unknown website;
    querying, with the computed MinHash, the three or more respective LSH ensemble indexes for the known websites, according to a containment query, wherein the containment query is computed according to an intersection of two sets; and
    extrapolating a classification for the unknown website based on results of the querying.

19. The method of claim 18, wherein extrapolating the classification comprises identifying a plurality of known sites with a highest containment percentage selected from the three or more LSH ensemble indexes, and extrapolating the classification according to a known classifier assigned to a majority or a simple plurality of the plurality of known sites with the highest containment percentage.

20. The method of claim 18, wherein extrapolating the classification comprises computing a Jaccard distance between the unknown website and a plurality of matching websites with an LSH Ensemble containment value above a threshold, and selecting a known classifier from a known website with a minimum Jaccard distance.

* * * * *